US009513928B2

(12) United States Patent
Hsieh et al.

(10) Patent No.: US 9,513,928 B2
(45) Date of Patent: Dec. 6, 2016

(54) METHOD OF OPERATING MULTIPLE OPERATING SYSTEMS AND THE ELECTRONIC DEVICE THEREOF

(71) Applicant: Quanta Computer Inc., Kuei Shan Hsiang, Tao Yuan Shien (TW)

(72) Inventors: Ta-Jen Hsieh, Tao Yuan Shien (TW); Ying-Tsang Lin, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 204 days.

(21) Appl. No.: 14/322,004

(22) Filed: Jul. 2, 2014

(65) Prior Publication Data

US 2015/0277933 A1 Oct. 1, 2015

(30) Foreign Application Priority Data

Mar. 31, 2014 (TW) .............................. 103111916 A

(51) Int. Cl.
*G06F 9/24* (2006.01)
*G06F 9/44* (2006.01)
*G06F 9/445* (2006.01)

(52) U.S. Cl.
CPC .............. *G06F 9/4408* (2013.01); *G06F 8/61* (2013.01); *G06F 8/62* (2013.01); *G06F 9/441* (2013.01); *G06F 9/4411* (2013.01)

(58) Field of Classification Search
CPC ........... G06F 8/61; G06F 8/62; G06F 9/4408
USPC .......................................................... 713/1
See application file for complete search history.

(56) References Cited

U.S. PATENT DOCUMENTS

| 6,178,503 | B1 * | 1/2001 | Madden ................... G06F 1/24 710/8 |
| 8,769,256 | B2 | 7/2014 | Wu et al. |
| 8,918,630 | B1 * | 12/2014 | Streuter ............... G06F 9/4408 709/222 |
| 9,003,173 | B2 | 4/2015 | Baribault et al. |
| 2002/0029301 | A1 * | 3/2002 | Toda ..................... G06F 9/4406 719/319 |
| 2006/0123201 | A1 * | 6/2006 | Wu ........................ G06F 9/4406 711/147 |

(Continued)

FOREIGN PATENT DOCUMENTS

| JP | 2010-541072 | 12/2010 |
| TW | 201232249 | 8/2012 |

OTHER PUBLICATIONS

Taiwanese language office action dated Apr. 24, 2015, issued in application No. 103111916.

(Continued)

*Primary Examiner* — Thomas Lee
*Assistant Examiner* — Volvick Derose
(74) *Attorney, Agent, or Firm* — McClure, Qualey & Rodack, LLP

(57) ABSTRACT

The present invention discloses a method of operating multiple operating systems. The method including installing at least one first operating system and one second operating system in an electronic device, wherein the first and second operating systems are based on the same platform system, but set with different configurations; planning a common memory block from a storage device of the electronic device, wherein the common memory block is used to store a plurality of common files for operating the first and second operating systems; and loading the first or second operating system according to user settings or predefined settings when starting the electronic device.

15 Claims, 3 Drawing Sheets

(56) References Cited

U.S. PATENT DOCUMENTS

| | | | | |
|---|---|---|---|---|
| 2006/0149956 A1* | 7/2006 | Chang | G06F 9/441 | 713/1 |
| 2006/0212691 A1* | 9/2006 | Wood | G06F 9/441 | 713/1 |
| 2007/0038685 A1* | 2/2007 | Chan | G06F 9/441 | |
| 2011/0093691 A1* | 4/2011 | Galicia | G06F 9/4406 | 713/2 |
| 2011/0161644 A1* | 6/2011 | Nojiri | G06F 9/5077 | 713/1 |
| 2012/0102314 A1* | 4/2012 | Zheng | G06F 9/4411 | 713/2 |
| 2012/0191961 A1* | 7/2012 | Wu | G06F 1/3275 | 713/2 |
| 2012/0227040 A1* | 9/2012 | Gounares | G06F 9/45558 | 718/1 |
| 2013/0298141 A1* | 11/2013 | Wolfe | G06F 8/61 | 719/319 |
| 2014/0025942 A1* | 1/2014 | Nakazima | G06F 9/4408 | 713/2 |
| 2014/0108951 A1* | 4/2014 | Dharawat | G06F 9/543 | 715/747 |

OTHER PUBLICATIONS

Japanese language office action dated Feb. 18, 2016, issued in application No. JP 2015-011993.
English language translation of office action.
"MeeGoxAndrioid;" Nexus One; May 2011; pp. 1-8.
English language translation of non-patent literature "MeeGoxAndrioid".

* cited by examiner

| OS | partition table | storage capacity |
|---|---|---|
| OS1 | booting data | 6MB |
| | system files | 650MB |
| | cache | 1024MB |
| | user data | 6144MB |
| OS2 | booting data | 6MB |
| | system files | 650MB |
| | cache | 1024MB |
| | user data | 5420MB |

FIG. 2A

| OS | partition table | storage capacity |
|---|---|---|
| OS1 | booting data | 6MB |
| | system files | 650MB |
| | cache | 1024MB |
| | user data | 13244MB |

FIG. 2B

METHOD OF OPERATING MULTIPLE OPERATING SYSTEMS AND THE ELECTRONIC DEVICE THEREOF

CROSS REFERENCE TO RELATED APPLICATION

The present application is based on, and claims priority from, Taiwan (International) Application Serial Number 103111916, filed Mar. 31, 2014, the invention of which is hereby incorporated by reference herein in its entirety.

TECHNICAL FIELD

The technical field relates to a method of operating multiple operating systems, and more particularly to a method for switching between multiple operating systems.

BACKGROUND

Most Android tablets are equipped with a single operating system nowadays. Users of the Android operating system can download needed applications from the Android market. However a tablet PC equipped with a single operating system cannot gradually satisfy all application requirements. In view of the above, the present invention provides a method of operating multiple operating systems for providing more application options to users.

SUMMARY

An embodiment of the present invention provides a method of operating multiple operating systems. The software update method includes the steps of: installing at least one first operating system and one second operating system in an electronic device, wherein the first and second operating systems are based on a common platform system, but set with different configurations; planning a common memory block from a storage device of the electronic device, wherein the common memory block is used to store a plurality of common files for operating the first and second operating systems; and loading the first or second operating system according to user settings or predefined settings when starting the electronic device.

An embodiment of the present invention provides an electronic device for operating multiple operating systems. The electronic device includes a first operating system, a second operating system, a storage device and a processor. The first and second operating systems are based on the same platform system, but set with different configurations. The storage device has a common memory block used to store a plurality of common files for operating the first and second operating systems. The processor coupled to the storage device loads the first or second operating system according to user settings or predefined settings when starting the electronic device.

BRIEF DESCRIPTION OF THE DRAWINGS

The present invention can be more fully understood by reading the subsequent detailed description and examples with references made to the accompanying drawings, wherein:

FIG. 2A and FIG. 2B show configuration diagrams (partition tables) of usage space before and after merging the first and second usage space, respectively.

DETAILED DESCRIPTION

The following description is of the best-contemplated mode of carrying out the present invention. This description is made for the purpose of illustrating the general principles of the present invention and should not be taken in a limiting sense. The scope of the present invention is best determined by reference to the appended claims.

Figure 1:
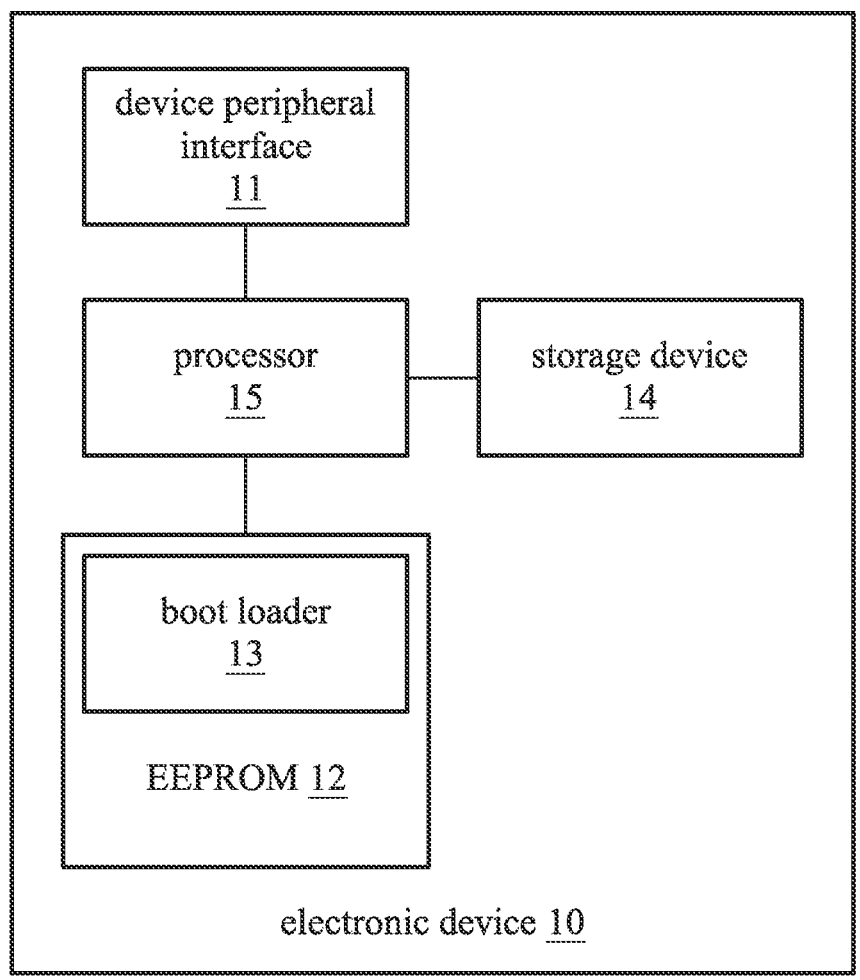
FIG. 1 is a block diagram showing an electronic device 10 equipped with multiple operating systems according to a first embodiment of the present invention.

FIG. 1 is a block diagram showing an electronic device 10 equipped with multiple operating systems according to a first embodiment of the present invention. In the first embodiment, the electronic device 10 includes a device peripheral interface 11, an electrically-erasable programmable read-only memory (EEPROM) 12, a boot loader 13, a storage device 14 and a processor 15. The processor 15 is coupled to the device peripheral interface 11, the EEPROM 12, the boot loader 13 and the storage device 14 respectively. In the first embodiment, the electronic device 10 can be a tablet PC or a smartphone, but the present invention is not limited thereto.

The device peripheral interface 11 includes an LCD touch screen, and a computer keyboard, or other I/O interfaces. In the first embodiment, the EEPROM 12 is the embedded multi-media card (eMMC) applied in a tablet PC or a smartphone, but the present invention is not limited thereto. The boot loader 13 is a segment of instruction codes stored in the EEPROM 12. The boot loader 13 is a bridge used for communication between the firmware and hardware of the electronic device 10. After the electronic device 10 starts, the processor 15 first performs the boot loader 13 to initialize the hardware of the electronic device 10. Performing the boot loader 13 establishes memory-mapped graphics and thus leads the software environment of the electronic device 10 into a suitable status. In other words, the processor 15, by performing the boot loader 13, leads the electronic device 10 to correctly start the operating system stored in the electronic device 10. The storage device 14 is used to store file data related to multiple operating systems such as applications (APP), Image files, setup files (config) etc. . . . . In the first embodiment, the storage device 14 is the memory device of the electronic device 10 (i.e. Secure Digital Memory Card or Hard Disk), but the present invention is not limited thereto.

In the first embodiment, the multiple operating systems are all belonged to the Android operating system and constitute a first operating system and a second operating system. The processor 15 allocates a usage space of the storage device 14 for each operating system according to the partition value of the Image file of each operating system. The storage device has a first usage space that 14 is allocated to the first operating system and a second usage space that is allocated to the second operating system. In addition, the storage device 14 has a common memory block. The common memory block is used to store the common files for operating the first and second operating systems.

The first and second operating systems are set with different configurations according to different user demands. For example, the first operating system is the Android 4.4 operating system, but the second operating system is the Android 4.3 operating system. Or the first and second operating systems are both the Android 4.4 operating system, but the system environment of the first operating system is set for processing documents and the system environment of the second operating system is set for playing multi-media files. In addition, it is notable that each operating system installed in the electronic device 10 can be upgraded through the mobile internet network or the Wi-Fi network (i.e. Over-the-Air, OTA). For example, the tablet PC can upgrade the version of the second operating system from Android 4.3 to Android 4.4 through the Wi-Fi network.

In a second embodiment of the present invention, the user can switch the first operating system (or the second operating system) to the second operating system (or the first operating system) by restarting the electronic device 10. Through previously setting a flag value into the boot loader 13 (or previously setting the partition table values of the first and second operating systems), the processor 15 can determine to load the first or second operating system according to the flag value (or the partition table values) after the electronic device 10 just started. In addition, the processor 15 can also determine to load the first or second operating system according to the user's preference from the device peripheral interface 11 after the electronic device 10 just started. After the user chooses an operating system (the first or second operating system), the processor 15 leads the electronic device 10 to correctly load the selected operating system. For example, a touch screen of a tablet PC shows an option to load the first or second operating system after the tablet PC has been started by the user. Then the user chooses to load the first operating system by touching the touch screen of the tablet PC. Finally, the processor of the tablet PC continues performing the boot loader to initialize the initial configuration of the electronic device 10 before entering into the first operating system.

In a third embodiment of the present invention, the user can remove the first operating system (the second operating system) through the device peripheral interface 11. For example, the user can remove the first operating system through touching the touch screen of a tablet PC. At this time, the processor 15 erases the setup file of the first operating system burned in the EEPROM 12 (i.e. eMMC) and restarts the electronic device 10. Then the processor 15 loads another operating system (the second operating system) burned in the EEPROM 12 after the processor 15 performs the boot loader to initialize the initial configuration of the electronic device 10. In another example, the electronic device 10 is running the first operating system and the user plans to remove the first operating system. At this time, the user can choose, through the application installed in the first operating system, to remove the first operating system. After the user chooses to remove the first operating system, the processor 15 restarts the electronic device 10 and performs the above step of removing the first operating system.

In a fourth embodiment of the present invention, the user releases the first usage space (the second usage space) for the second usage space (the first usage space) after the user removes the first operating system (the second operating system). For example, as shown in the example of the third embodiment, the user can remove the first operating system through touching the touch screen of a tablet PC. At this time, the processor 15 erases the setup file of the first operating system burned in the EEPROM 12 (i.e. eMMC) and restarts the electronic device 10. The difference in the third embodiment is that the processor 15 burns a merge instruction into the EEPROM 12 when the processor 15 erases the setup file of the first operating system burned in the EEPROM 12, but the present invention is not limited thereto. The merge instruction is used to release the first usage space of the first operating system for the second usage space of the second operating system. Then the processor 15 integrates the system resources of the first and second operating systems (i.e. merges the first and second usage space as a new second usage space) by the merge instruction. The merge instruction significantly increases the system resource of the second operating system (i.e. the usage space of an SD card). Finally, the processor 15 continues performing the boot loader 13 to initialize the initial configuration of the electronic device 10 before entering into the second operating system.

In another example, the electronic device 10 is running the first operating system and the user plans to remove the first operating system. At this time, the user can choose, through the application installed in the first operating system, to remove the first operating system. Then the application asks the user that whether to release the first usage space of the first operating system or not. After the user chooses to release the first usage space of the first operating system, the processor restarts the electronic device 10 and performs the above steps of releasing the first usage space to the second usage space. With the growing popularity of the multimedia and social networks, consumer demand for larger-capacity tablet PCs and smartphones is also growing. Through the method of the fourth embodiment, the user can obtain more usage space for the second operating system after removing the unused first operating system.

FIG. 2A and FIG. 2B show configuration diagrams (partition tables) of usage space before and after merging the first and second usage space. In FIG. 2A and FIG. 2B, the storage capacity of the storage device 14 is 16 GB, and the first and second operating systems are represented by OS1 and OS2 respectively. As shown in FIG. 2A, the storage capacity configuration for the first usage space of OS1 includes booting data (6 MB), system files (650 MB), cache (1024 MB) and user data (6144 MB), and the storage capacity configuration for the second usage space of OS2 includes booting data (6 MB), system files (650 MB), cache (1024 MB) and user data (5420 MB). When the user removes the first operating system through the application, the processor 15 releases the second usage space of the second operating system (8100 MB). As shown in FIG. 2B, the processor 15 merges the second usage space of the second operating system into the user data of the first operating system. Thus the storage capacity of the first usage space increases from 6144 MB to 13244 MB. Through the above embodiment of FIG. 2A and FIG. 2B, the user can obtain more usage space for the first operating system after removing the unused second operating system.

Figure 3:
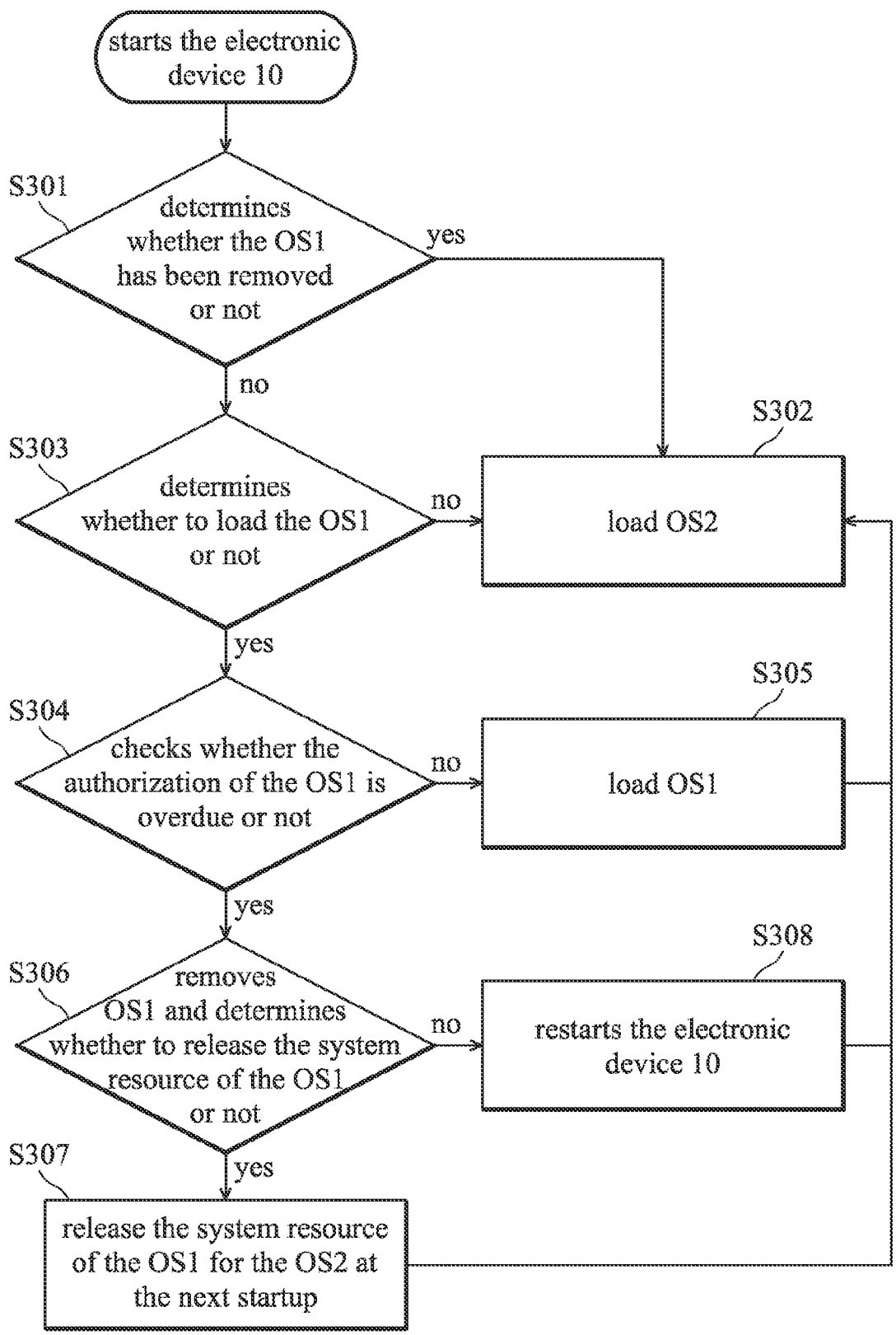
FIG. 3 shows a flow diagram to illustrate a method of operating multiple operating systems according to a fifth embodiment of the present invention.

FIG. 3 shows a flow diagram to illustrate a method of operating multiple operating systems according to a fifth embodiment of the present invention. The fifth embodiment introduces how to automatically remove the first operating system (the second operating system) if the authorization of the first operating system (the second operating system) is overdue, wherein the first and second operating systems are represented by OS1 and OS2 respectively. In step S301, the processor 15 determines whether the OS1 has been removed or not after the user starts the electronic device 10. If the OS1 has been removed, the processor 15 performs the boot loader 13 to load the OS2 (step S302). If the OS1 has not been removed, then the method proceeds to step S303. In step S303, the processor 15 determines, through the content of the boot loader 13 or the result of the user operating the device peripheral interface 11, whether to load the OS1 or not. If the OS1 of the processor 15 determines to load the OS1, then the method proceeds to step S304; otherwise, the processor 15 performs the boot loader 13 to load the OS2 (step S302). In step S304, the processor 15 checks whether the authorization of the OS1 is overdue or not. If the authorization of the OS1 is overdue, then the method proceeds to step S306; otherwise, the processor 15 performs the boot loader 13 to load the OS1 (step S305). In step S306, the processor 15 removes the OS1 and restarts the electronic device 10. Then the processor 15 determines whether to release the system resource (i.e. usage space) of the OS1 or not. If the processor 15 determines to release the system resource of the OS1, then the method proceeds to step S307; otherwise, the method proceeds to step S308. In step S307, the processor 15 burns a merge instruction into the EEPROM 12 such that the processor 15 will release the system resource of the OS1 (i.e. the first usage space) for the OS2 at the next startup. Then the processor 15 restarts the electronic device 10 and the method proceeds to step S302. In step S308, the processor 15 restarts the electronic device 10 and the method proceeds to step S302.

It is notable that the first to fifth embodiments only use two operating systems in the purpose of facilitating understanding. However the methods of the first to fifth embodiments all can apply to an electronic device 10 installed with more than two operating systems. For example, the electronic device 10 is installed with a first operating system, a second operating system and a third operating system. The user can use the method introduced in the second embodiment to switch the first operating system to the second operating system or the third operating system. The user also can use the method introduced in the third embodiment to remove any of the three operating systems. The user also can use the method introduced in the fourth embodiment to remove the second and third operating systems and to release the usage space of the second and third operating systems for the first operating system. The user also can use the method introduced in the fifth embodiment to remove any of the three operating systems because the authorization of any of the three operating systems is overdue.

While the present invention has been described by way of example and in terms of preferred embodiment, it is to be understood that the present invention is not limited thereto. On the contrary, it is intended to cover various modifications and similar arrangements (as would be apparent to a person skilled in the art). Therefore, the scope of the appended claims should be accorded the broadest interpretation so as to encompass all such modifications and similar arrangements.

What is claimed is:

1. A method of operating multiple operating systems, comprising:
    installing at least one first operating system and one second operating system in an electronic device, wherein the first and second operating systems are based on the same platform system, but set with different configurations;
    planning a common memory block from a storage device of the electronic device, wherein the common memory block is used to store a plurality of common files for operating the first and second operating systems;
    loading the first or second operating system according to user settings or predefined settings when starting the electronic device;
    detecting, by the electronic device, whether the authorization of the first operating system or the second operating system loaded according to user settings is overdue or not when starting the electronic device;
    removing the first operating system if the authorization of the first operating system is overdue; and
    removing the second operating system if the authorization of the second operating system is overdue.

2. The method of claim 1, further comprising:
    setting a first usage space in the storage device of the electronic device for the first operating system; and
    setting a second usage space in the storage device of the electronic device for the second operating system.

3. The method of claim 2, further comprising:
    releasing the second usage space after removing the second operating system; and
    merging the second usage space into the first usage space.

4. The method of claim 2, further comprising:
    detecting, by the electronic device, which operating system (the first or second operating system) has been removed when starting the electronic device; and
    loading the first or second operating system which has not been removed.

5. The method of claim 1, further comprising:
    setting the electronic device to load the second operating system at the next startup when the authorization of the first operating system is overdue.

6. The method of claim 1, wherein the platform system is an Android operating system.

7. The method of claim 1, further comprising:
    updating, by the electronic device, the first and second operating systems through an internet network.

8. An electronic device for operating multiple operating systems, comprising:
    a first operating system and a second operating system, wherein the first and second operating systems are based on the same platform system, but set with different configurations;
    a storage device having a common memory block used to store a plurality of common files for operating the first and second operating systems; and
    a processor, coupled to the storage device, loading the first or second operating system according to user settings or predefined settings when starting the electronic device, wherein the processor detecting whether the authorization of the first operating system or the second operating system loaded according to user settings is overdue or not when starting the electronic device;
    wherein the processor removes the first operating system if the authorization of the first operating system is overdue; and
    wherein the processor removes the second operating system if the authorization of the second operating system is overdue.

9. The electronic device of claim 8, further comprising:
    the processor setting a first usage space in the electronic device for the first operating system; and
    the processor setting a second usage space in the electronic device for the second operating system.

10. The electronic device of claim 9, further comprising:
    the processor releasing the second usage space after the processor removing the second operating system; and
    the processor merging the second usage space into the first usage space.

11. The electronic device of claim 9, further comprising:
    the processor detecting which operating system (the first or second operating system) has been removed when starting the electronic device; and
    the processor loading the first or second operating system which has not been removed.

12. The electronic device of claim 8, wherein the processor sets the electronic device to load the second operating system at the next startup when the authorization of the first operating system is overdue.

13. The electronic device of claim 8, wherein the platform system is an Android operating system.

14. The electronic device of claim 8, wherein the electronic device updates the first and second operating systems through an internet network.

15. The electronic device of claim 8, wherein the storage device further stores the first and second operating systems.

\* \* \* \* \*